Patented Aug. 25, 1925.

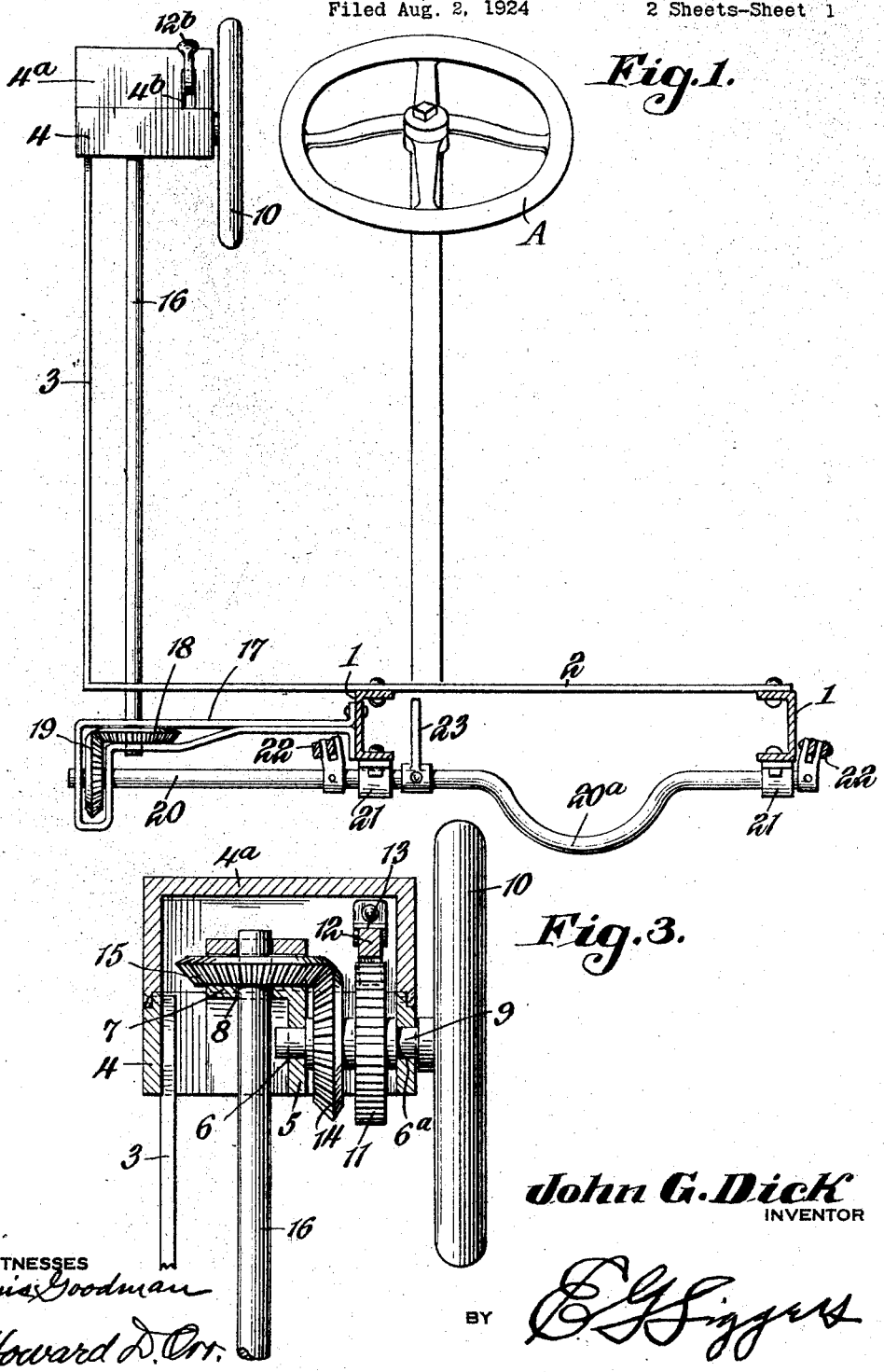

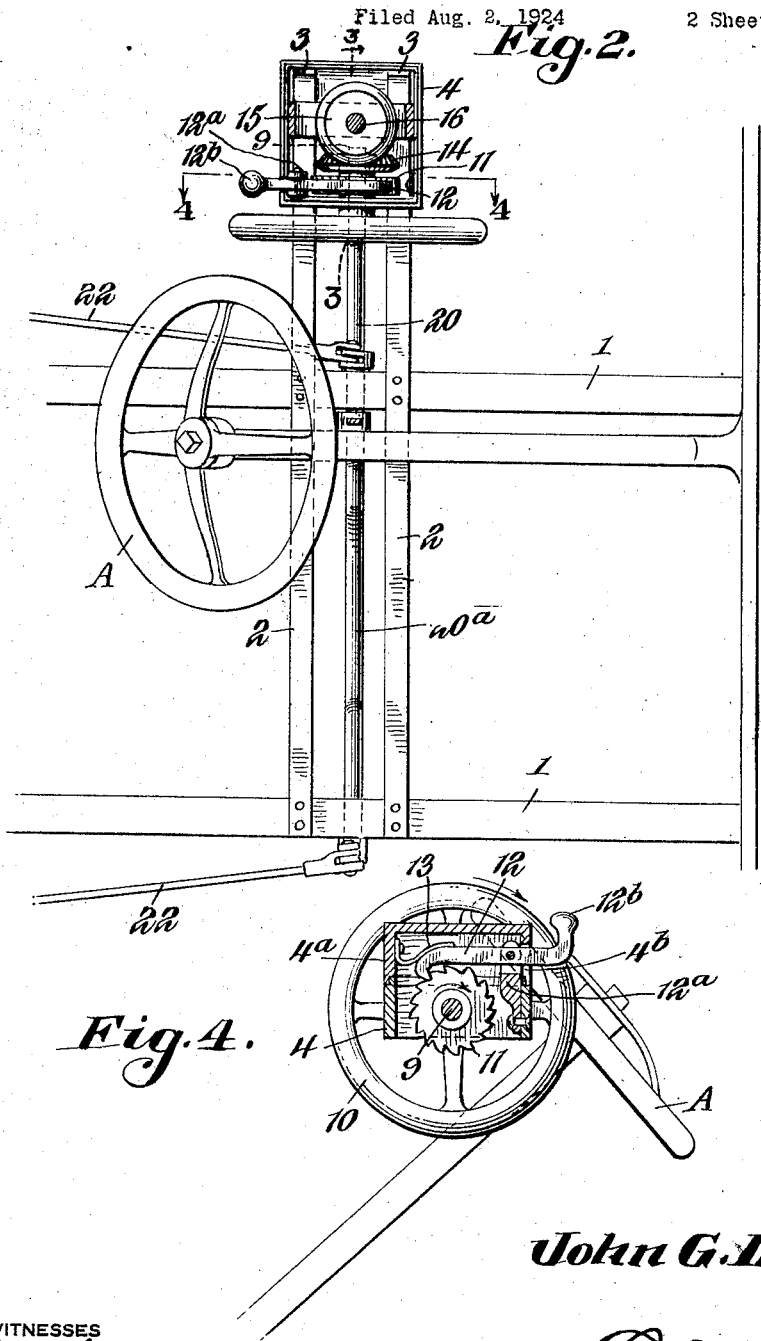

1,551,244

UNITED STATES PATENT OFFICE.

JOHN G. DICK, OF CHINOOK, MONTANA.

BRAKE-OPERATING MECHANISM FOR AUTOMOBILES.

Application filed August 2, 1924. Serial No. 729,774.

*To all whom it may concern:*

Be it known that I, JOHN G. DICK, a citizen of the United States, residing at Chinook, in the county of Blaine and State of Montana, have invented new and useful Improvements in Brake-Operating Mechanism for Automobiles, of which the following is a specification.

This invention relates to brake operating mechanism for automobiles.

The object is to enable the driver of a car to quickly and easily apply the brakes in an emergency without releasing his hold on the steering wheel with one hand and groping around for the hand brake lever, an operation which requires him to lean forwardly and change his position, more or less, on the driver's seat, and distracting his attention from the path before him.

Another object is to provide simple mechanism which may be easily installed in position in cars of various types without very materially adding to the cost thereof, said mechanism being located at one side of the car, say the left side, in accordance with present-day methods of construction, and having means which may be readily grasped by the left hand with a minimum amount of movement of the same, after releasing the hold upon the steering wheel, to forcibly and effectively apply the brakes.

A final object is to provide mechanism for operating brakes which may be installed without materially affecting the present construction and connected up to the controller shaft, as found in certain makes of cars, to actuate the same in the required manner to apply the brakes, and without disturbing the present connections between the said shaft and the clutch pedal, whereby the pedal may be depressed to actuate the clutch without affecting the brakes, but when the improved device is operated to rotate the controller shaft and apply the brakes, the clutch is also thrown out.

A full and complete understanding of the invention may be obtained from a consideration of the following detailed description, taken in connection with the accompanying drawings, forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a view, taken transversely of the chassis of an automobile, and showing the improved brake operating means in elevation.

Figure 2 is a top plan view thereof.

Figure 3 is a sectional view taken on the line 3—3 of Figure 1 and looking in the direction of the arrow.

Figure 4 is a sectional view taken on the line 4—4 of Figure 1 and looking in the direction of the arrow.

Referring to the drawings, particularly Figure 1 thereof, there is shown the frame members 1 of the chassis of an automobile in transverse section, and to which are adapted to be rigidly secured a pair of transverse bars 2 of sufficient strength to support the improved device in a manner to be explained. The bars 2 extend outwardly to the left of the car, and beyond the left hand frame member a sufficient distance to correspond with the side of the car body, whether the same be of the open or closed model, the said bars being there bent upwardly to form legs or standards 3 extended to a position substantially on a level with the steering wheel A of the car, and substantially opposite the same transversely of the car.

The standards 3 are secured at their upper ends to a bearing frame 4, comprising a rectangular box-like structure having four vertical walls without top or bottom walls, and formed in their upper edges for the reception of a cover $4^a$, which is adapted to be held in position thereon in any suitable manner. An angular cross bar is secured within the frame 4, the upper face of which is arranged substantially flush with the upper edge of the said frame and extends longitudinally of the car. The said bar is provided in its vertical flange 5 with a horizontal bearing opening 6 arranged at the center thereof, and the horizontal flange 7 is likewise provided with a vertical bearing opening 8. Opposite to the bearing 6, the inner wall of the bearing frame 4 is also provided with a bearing opening $6^a$, in alinement with the bearing 6 and adapted to receive therewith, a relatively short shaft 9 arranged transversely of the car and extending inwardly towards the steering wheel A a distance sufficient to receive a hand wheel 10 for turning said shaft.

The shaft 9 also carries a ratchet wheel 11 located just within the adjacent inner wall of the bearing frame, and said ratchet wheel is adapted to be engaged by a dog or pawl 12, pivotally mounted on a bracket 12ª secured to the frame 4, the said pawl having a projecting end provided with a knob 12ᵇ which extends through a suitable slot 4ᵇ formed in the rear wall of the cover 4ª. At the front end the pawl is in contact with a leaf spring 13, which holds the toothed end thereof in engagement with the ratchet wheel 11.

The shaft 9 also carries a beveled gear 14 adjacent to the ratchet wheel, and the same is adapted to mesh with a similar wheel 15 mounted on a vertical shaft 16 having its upper end seated in the aforesaid bearing 8. The vertical shaft 16, together with the upright rods 3 are adapted to be located just within the body of this car, or the same may be concealed therein as the car is built.

Secured to the left hand frame member 1 is an outstanding bracket 17, bent or returned upon itself to provide a housing at its outer end, and to provide a double bearing for the lower end of the vertical shaft 16 which carries a bevel gear 18 in mesh with a coacting bevel gear 19 mounted on the extended end 20 of the controller shaft of the automobile.

The controller shaft which ordinarily has the hand brake lever connected thereto, but which is now eliminated, is mounted in bearings 21 connected to the under sides of the frame members 1, and has the usual bowed portion 20ª between the said members 1, which provides for the usual transmission housing located at this point and not shown in the drawings. The outer end of the controller shaft is mounted in bearings formed in the housing at the outer end of the aforesaid bracket 17, and the bevel gears 18 and 19 are located within said housing, as shown in Figure 1.

The usual crank arms are secured to the controller shaft near the outer sides of the members 1, to which are connected the brake pull rods 22, and at the inner side of the left hand member 1 there is connected the usual arm 23, used in Ford cars, said arm having a cam (not shown) for coaction with the usual clutch pedal through certain connections, whereby the said clutch pedal may be depressed for throwing out the clutch without effecting the controller shaft 20, but which provides for throwing out the said clutch whenever the brakes are applied through the improved mechanism.

From the foregoing it will be seen that simple means have been provided for applying the brakes to the rear wheel of automobiles, said means being easily actuated by a slight movement of the left hand of the driver from its position on the steering wheel to the periphery of the brake wheel 10, when a slight movement downwardly on the same serves to apply the brakes to a greater or lesser degree. It is not necessary to turn the wheel more than a portion of a revolution to stop the car, and for this reason the gears 14, 15, 18 and 19 may be in the form of segments, and the form of the lower bracket 17 may be changed also.

When the brakes are applied and under tension, the pawl 12 holds the same by its engagement with the ratchet wheel, and it is only necessary to depress the knob end thereof to release the same.

What is claimed is:—

1. In brake operating mechanism for automobiles, the combination with the brake controlling shaft thereof, of a brake applying hand wheel located to one side of and adjacent to the steering wheel, said brake applying wheel being mounted on a relatively short horizontal shaft arranged transversely of the automobile and substantially on a level with said steering wheel, a horizontally disposed bearing frame located at the adjacent side of the automobile body and having alined, spaced bearings for said shaft, a bevel gear and a ratchet wheel mounted on the latter shaft, a vertical shaft located at the said side of the automobile and having is upper end mounted in a bearing in said frame and provided with a bevel gear in mesh with the first bevel gear, a cover removably secured to the frame, a spring-pressed pawl carried by the cover to engage the ratchet wheel to hold the short shaft from turning, said pawl having an end exposed through the cover to release the same, upright arms mounted on the chassis and connected to the bearing frame to support the latter, a horizontally disposed bearing bracket extending laterally from the outer side of the chassis and having a bearing for the extended end of the brake controlling shaft and also a bearing for the lower end of the said vertical shaft, and coacting beveled gears mounted within the bracket and on the adjacent ends of the brake controlling shaft and the vertical shaft respectively to apply the brakes when the said brake applying hand wheel is rotated.

2. In mechanism for controlling the brakes of automobiles, a boxing frame mounted at the side of the automobile in line with the steering wheel thereof, a horizontal shaft mounted in the frame and having a hand wheel on its outer end outside of the frame adjacent to the said steering wheel, said hand wheel being located substantially at right angles to the steering wheel and spaced therefrom, pawl and ratchet means for preventing retrograde movement of the shaft and hand wheel, an outwardly extending support carried by the chassis of the automobile, a vertically disposed shaft mounted in said support at its lower end and in the boxing frame at its upper end, and gears connecting the vertical shaft to the hand wheel shaft and to the controller shaft of the automobile to apply the brakes when the hand wheel is turned, the hand wheel being adapted to be turned by the left hand while the steering wheel is turned by the right hand of the operator.

In testimony that I claim the foregoing as my own I have hereto affixed my signature.

JOHN G. DICK.